(No Model.)

F. MÜLLER.
ATTACHMENT FOR SCREW CUTTING MACHINES.

No. 311,200. Patented Jan. 27, 1885.

WITNESSES:
A. Schehl
Carl Karr

INVENTOR
Friedrich Müller
BY Gospel & Regen
ATTORNEYS.

UNITED STATES PATENT OFFICE.

FRIEDERICH MÜLLER, OF ELIZABETH, NEW JERSEY, ASSIGNOR TO HIMSELF AND MATTHEW MACDOUGALL, OF SAME PLACE.

ATTACHMENT FOR SCREW-CUTTING MACHINES.

SPECIFICATION forming part of Letters Patent No. 311,200, dated January 27, 1885.

Application filed December 26, 1883. (No model.)

*To all whom it may concern:*

Be it known that I, FRIEDERICH MÜLLER, of Elizabeth, in the county of Union and State of New Jersey, have invented certain new and useful Improvements in Knurling Attachments to Automatic Screw-Cutting Machines, of which the following is a specification.

This invention has reference to an improved knurling attachment for automatic screw-cutting machines of that class by which so-called "fancy screws," or screws with ornamental heads—such as are used for sewing-machines and similar purposes—are made. In the machines heretofore in use for this purpose the screws are cut from a continuous rod of the required thickness, first by reducing the shank of the screw to the required thickness, then threading the shank of the screw, then shaping the head, next knurling the circumference of the enlarged portion of the head, and finally cutting off the finished screw from the rod. The knurling of the head was heretofore accomplished by means of a knurling die or roller that was pressed against the center of the head of the screw, said die being removed again, so as to be out of the way of the cutting-off tool, by which considerable time is lost.

The object of my invention is to so improve the automatic screw-cutting machines that the knurling attachment is arranged on the same slide with the tools that shape the head of the screw and cut off the screw after the knurling is completed, the knurling-die being applied to the head of the screw at the proper moment during the forward motion of the slide-piece, whereby the construction of the screw-machines are simplified and a greater number of screws finished in a given time.

The invention consists of a knurling die or roller that is supported in laterally and vertically adjustable bearings of the slide-piece on which the head-shaping and cutting-off tools are moved transversely to the wire rod from which the screws are cut, said knurling-die being located intermediately between said tools, and so as to pass below or above the rod from which the screws are made.

Figure 1:
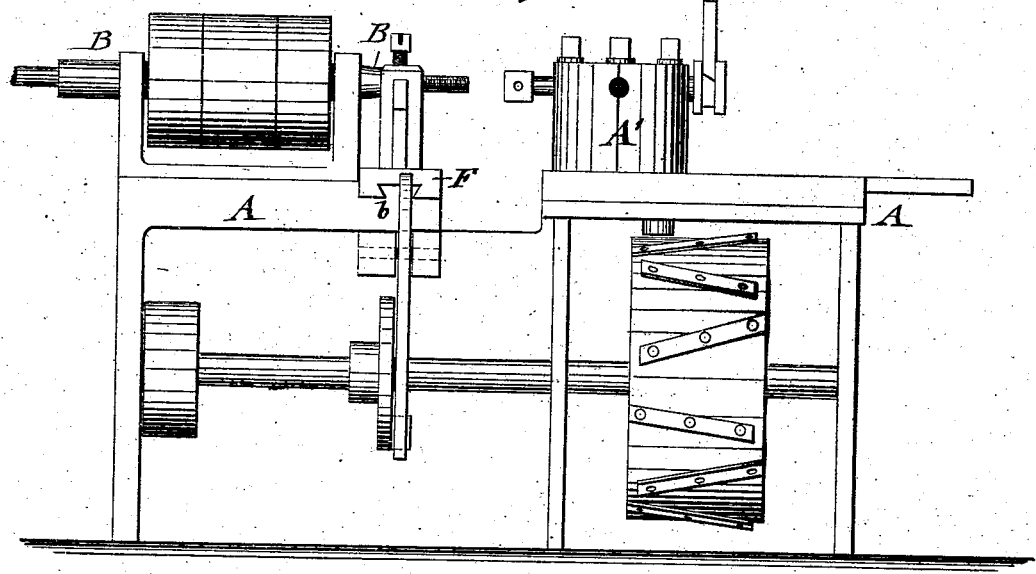
Figure 2:
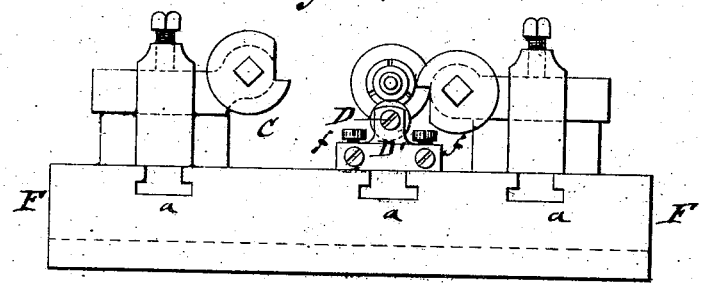
Figure 3:
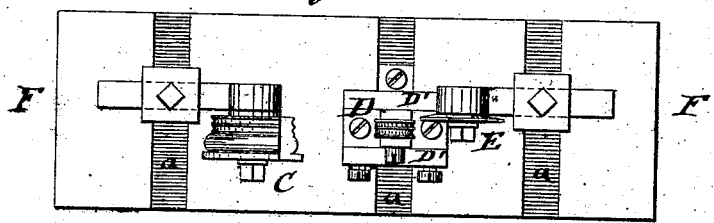
Figure 4:
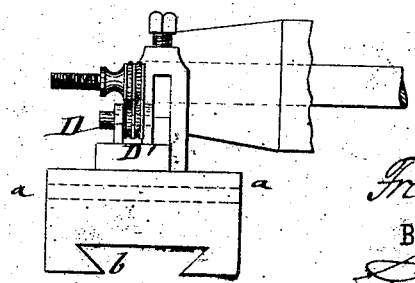

In the accompanying drawings, Figure 1 represents a side elevation of an automatic screw-cutting machine; and Figs. 2, 3, and 4 are respectively a side elevation, a plan, and an end view of a slide-piece with my improved knurling attachment, said figures being drawn on a larger scale.

Similar letters of reference indicate corresponding parts.

A in the drawings represents the supporting-frame of an automatic screw-cutting machine. On the frame A is a revolving turret-head, A', to which the reducing-tool and threading-chuck are fastened in the usual manner. After the wire is fed for the proper length through the hollow spindle B the reducing or shank-cutting tool cuts it to the proper size, after which the shank is threaded by the threading-chuck. As soon as the threading of the shank is completed the wire rod is acted upon successively by a shaping-tool, C, for forming the head of the screw, a die, D, for knurling the circumference of the same, and a cutting-off tool, E, for separating the finished screw from the wire rod. The tools C and E and knurling-die D are adjustably supported in transverse ways $a\ a$ of a slide-piece, F, which is moved in ways $b$ of the frame A transversely to the wire rod, and actuated in the usual manner in screw-cutting machines. The head-shaping tool C begins to act the moment when the threading of the shank has been completed. As soon as the head has been shaped, the slide-piece F is moved forward, so that the knurling-die D, that is located intermediately between the head-shaping and cutting-off tools C and E, can be applied. The knurling die or roller D is supported in bearings D' of the slide-piece F, said bearings being vertically adjustable by set-screws $f\ f$, so that the knurling-die D can be set exactly to the diameter of the screws to be knurled. The die D is supported in its bearings D' below or above the screw-head, so that the knurling-die can pass from one side of the screw to the other, as shown in Fig. 2. By the pressure of the knurling-die against the circumference of the head and the simultaneous turning of the screw the knurling of the rim of the head is accomplished. As soon as the knurling operation is completed the slide-piece F moves the cutter E against the wire rod, the cutter E cutting off the screw, which is then dropped into a suitable receiver. The slide-piece F is then returned and moved forward again at the proper time, so that the operations just described are repeated, the wire rod having first been fed forward in the spindle B for the required distance.

The essential feature of my invention is that the knurling-die D is arranged in line with and on the same slide-piece with the head-shaping and cutting tools C and E, so that the knurling-die is applied to the heads of the screws during the forward motion of the slide-piece F without requiring a special lateral motion for applying the knurling-die, as heretofore. In this manner the finishing of fancy screws, nuts, and other articles that require knurling can be quickly and automatically accomplished on the screw-cutting machines described.

I am aware that automatic screw-cutting machines in which the shaping-tools, parting-tool, and knurling-tool are placed on a revolving head supported on a cross-slide have been used heretofore. In this case the first tool to operate on the screw-head is the shaping-tool. When this has done its work, the slide moves back and revolves the head, bringing the second shaping-tool into the position before occupied by the first shaping-tool. The slide then moves forward and brings this tool into contact with the head of the screw, and when it has performed its operation the slide moves backward again, the head revolves and brings the knurling-tool into the position formerly occupied by the shaping-tools. When in that position, the slide moves forward, bringing the knurling-tool into contact with the head of the screw, pressing against the center of the screw-head. When the knurling has been finished, the slide moves backward again and the head revolves, bringing the parting-tool into the position occupied by the shaping and knurling tools, after which the slide moves forward again and cuts off the finished head of the screw. These different operations consume considerable time, as they require eight movements of the cross-slide and four tools to perform the same amount of work that in my knurling attachment is performed by two movements of the cross-slide and three tools. My knurling attachment requires no revolving head, and is considerably simpler than the knurling devices of the screw-cutting machines heretofore in use. The tools are placed on a cross-slide into one and the same line, the knurling attachment passing entirely under the head of the screw and not pressing on the side, whereby only two movements of the cross-slide are required, and the construction of the machine considerably reduced.

Having thus described my invention, I claim as new and desire to secure by Letters Patent—

In an automatic screw-cutting machine, the combination, with a transversely-sliding tool-supporting piece, of a head-shaping tool, a cutting-off tool, and a knurling die or roller that is supported on said sliding piece intermediately between said tools, substantially as described.

In testimony that I claim the foregoing as my invention I have signed my name in presence of two subscribing witnesses.

FRIEDERICH MÜLLER.

Witnesses:
CARL BONTGEN,
HERMAN F. BEEKER.